United States Patent
Chon et al.

(10) Patent No.: US 10,891,965 B2
(45) Date of Patent: **\*Jan. 12, 2021**

(54) METHOD AND APPARATUS FOR DECODING AUDIO BITSTREAM INCLUDING SYSTEM DATA

(71) Applicant: SAMSUNG ELECTRONICS CO., LTD., Suwon-si (KR)

(72) Inventors: Sang-bae Chon, Suwon-si (KR); Sun-min Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/822,738

(22) Filed: Mar. 18, 2020

(65) Prior Publication Data

US 2020/0219520 A1    Jul. 9, 2020

Related U.S. Application Data

(63) Continuation of application No. 16/246,042, filed on Jan. 11, 2019, now Pat. No. 10,672,410, which is a (Continued)

(51) Int. Cl.
*G10L 19/06* (2013.01)
*H04N 21/4363* (2011.01)
(Continued)

(52) U.S. Cl.
CPC ......... *G10L 19/06* (2013.01); *H04N 21/4394* (2013.01); *H04N 21/43635* (2013.01);
(Continued)

(58) Field of Classification Search
CPC .......... H03M 7/34; G10L 19/00; G10L 19/06
(Continued)

(56) References Cited

U.S. PATENT DOCUMENTS

| 8,538,197 B2 | 9/2013 | Kobayashi et al. |
| 8,854,434 B2 | 10/2014 | Saito et al. |

(Continued)

FOREIGN PATENT DOCUMENTS

| CN | 101772961 A | 7/2010 |
| CN | 101998132 A | 3/2011 |

(Continued)

OTHER PUBLICATIONS

Max Neuendorf et al.: "Proposed DIS Text of MPEG-H 3D audio", International Organisation for Standardisation Organisation Internationale De Normalisation ISO/IEC JTC1/SC29/WG11 Coding of Moving Pictures and Audio, Jul. 2014, No. M34263, XP030062636, (2 pages total).

(Continued)

*Primary Examiner* — Melur Ramakrishnaiah
(74) *Attorney, Agent, or Firm* — Sughrue Mion, PLLC

(57) ABSTRACT

Provided are an apparatus and method for decoding audio, The method includes receiving a bitstream consisting of audio packets; decoding an audio packet included in the received bitstream, extracting a type of the decoded packet; obtaining system data from a packet of which system metadata corresponds to the extracted packet type; and transmitting the obtained system data to a system engine, wherein the system data includes at least one of information regarding a type of the system engine and a length of the system data.

14 Claims, 13 Drawing Sheets

Related U.S. Application Data continuation of application No. 15/550,842, filed as application No. PCT/KR2016/001508 on Feb. 15, 2016, now Pat. No. 10,217,471.

(60) Provisional application No. 62/238,832, filed on Oct. 8, 2015, provisional application No. 62/181,089, filed on Jun. 17, 2015, provisional application No. 62/173,665, filed on Jun. 10, 2015, provisional application No. 62/166,056, filed on May 25, 2015, provisional application No. 62/117,746, filed on Feb. 18, 2015, provisional application No. 62/116,533, filed on Feb. 15, 2015, provisional application No. 62/116,424, filed on Feb. 14, 2015.

(51) Int. Cl.
*H04N 21/439* (2011.01)
*H04N 21/658* (2011.01)
*H04N 21/854* (2011.01)
*G10L 19/16* (2013.01)

(52) U.S. Cl.
CPC ... *H04N 21/6581* (2013.01); *H04N 21/85406* (2013.01); *G10L 19/167* (2013.01)

(58) Field of Classification Search
USPC ..................................................... 700/95, 94
See application file for complete search history.

(56) References Cited

U.S. PATENT DOCUMENTS

| | | | |
|---|---|---|---|
| 2008/0259211 A1 | 10/2008 | Kraft et al. | |
| 2010/0135380 A1 | 6/2010 | Pasqualino | |
| 2010/0292820 A1* | 11/2010 | Yahata | H04N 9/8042 700/94 |
| 2011/0102554 A1 | 5/2011 | Saito et al. | |
| 2014/0013374 A1 | 1/2014 | Oh et al. | |
| 2014/0023197 A1 | 1/2014 | Xiang et al. | |
| 2016/0012775 A1 | 5/2016 | Oh et al. | |
| 2016/0127756 A1* | 5/2016 | Oh | H04N 21/4622 725/110 |

FOREIGN PATENT DOCUMENTS

| | | |
|---|---|---|
| EP | 2 343 907 A2 | 7/2011 |
| KR | 10-2010-0092693 A | 8/2010 |
| WO | 2014/171718 A1 | 10/2014 |
| WO | 2015011339 A1 | 1/2015 |

OTHER PUBLICATIONS

Communication dated Apr. 5, 2019, issued by the Korean Patent Office in counterpart Korean Application No. 10-2017-7018026.
Communication dated Nov. 15, 2017, issued by the European Patent Office in counterpart European Application No. 16749516.7.
Shuichi Aoki, et al., "Effective Usage of MMT in Broadcasting Systems", Oct. 8, 2013, IEEE International Symposium on BMSB, 6 pages total.
Stephan Schreiner et al: "Transport of User Interaction Data in an MPEG-H Bitstream", International Organisation for Standardisation Organisation Internationale De Normalisation ISO/IEC JTC1/SC29/WG11 Coding of Moving Pictures and Audio, Meeting of AHG on 3D Audio, DRC and Audio Maintenance, No. m33608, Jun. 2014 , XP030061981, (6 pages total).
Stephan Schreiner et al: "Extensions to the MHAS syntax", ISO/IEC JTC1/SC29/WG11, Meeting of AHG on 3D Audio, DRC and Audio Maintenance, , No. m33601, Jun. 2014 , XP030061974, (5 pages total).
Iraj Sodagar, I., "MPEG-DASH: The Standard for Multimedia Streaming Over Internet", 2011, IEEE MultiMedia, 7 pages total.
International Search Report and Written Opinion (PCT/ISA/210 & PCT/ISA/237) issued by the International Searching Authority dated Jun. 17, 2016 in counterpart International Patent Application No. PCT/KR2016/001508.
Office Action issued in parent U.S. Appl. No. 15/550,842 dated Apr. 11, 2018.
Office Action issued in parent U.S. Appl. No. 16/246,042 dated Aug. 1, 2019.
Communication dated Apr. 7, 2020, issued by the State Intellectual Property Office of People's Republic of China in counterpart Chinese Application No. 201680010203.6.
Jürgen Herre et al. "MPEG-H Audio—The New Standard for Universal Spatial / 3D Audio Coding" Journal of the Audio Engineering Society, Jan. 31, 2014, (12 pages total).
Yang Bin "Research of DVB-T Digital Television Scheme Based on Dual Embedded Processors" Huazhong University of Science and Technology, May 2006, (79 pages total).

* cited by examiner

FIG. 7

| Syntax 7000   7010 | No. of bits | Mnemonic |
|---|---|---|
| MHASPacketPayload(MHASPacketType)<br>{<br>  switch (MHASPacketType) {<br>    case PACTYP_SYNC:<br>      0xA5;                        /* syncword*/<br>      break;<br>    case PACTYP_MPEGH3DACFG:<br>      mpegh3daConfig();<br>      break;<br>    case PACTYP_MPEGH3DAFRAME:<br>      mpegh3daFrame();<br>      break;<br>    case PACTYP_FILLDATA:<br>      for (i=0; i< MHASPacketLength; i++) {<br>        mhas_fill_data_byte(i);<br>      }<br>      break;<br>    case PACTYP_SYNCGAP:<br>      syncSpacingLength = escapedValue(16,24,24)<br><br>      break;<br>    case PACTYP_MARKER:<br>      for (i=0; i< MHASPacketLength; i++) {<br>        marker_byte(i);<br>      }<br>      break;<br>    case PACTYP_CRC16:<br>      mhasParity16Data;<br>      break;<br>    case PACTYP_CRC32:<br>      mhasParity32Data;<br>      break;<br>    case PACTYP_DESCRIPTOR:<br>      for (i=0; i< MHASPacketLength; i++) {<br>        mhas_descriptor_data_byte(i);<br>      }<br>      break;<br>    case PACTYP_USERINTERACTION:<br>      mpegh3daElementInteraction();<br>      break;<br>    case PACTYP_LOUDNESS_DRC:<br>      mpegh3daLoudnessDrcInterface();<br>      break;<br>    case PACTYP_BUFFERINFO:<br>      mhas_buffer_fullness_present<br>      if (mhas_buffer_fullness_present)<br>        mhas_buffer_fullness = escapedValue(15, 24,32);<br>      }<br>      break;<br>    case PACTYP_SYSMETA: — 7020<br>      SysMetaPacket(); — 7030<br>      break;<br>  }<br>  ByteAlign();<br>} | <br><br><br><br>8<br><br><br><br><br><br><br><br><br><br>8<br><br><br><br>16,40,64<br><br><br><br><br>8<br><br><br><br>16<br><br><br>32<br><br><br><br>8<br><br><br><br><br><br><br><br><br><br>8<br><br>15,39,71 | <br><br><br><br>uimsbf<br><br><br><br><br><br><br><br><br><br>bslbf<br><br><br><br>uimsbf<br><br><br><br><br>bslbf<br><br><br><br>bslbf<br><br><br>bslbf<br><br><br><br>bslbf<br><br><br><br><br><br><br><br><br><br>uimsbf<br><br>uimsbf |

FIG. 8

| MHASPacketType | Value | |
|---|---|---|
| PACTYP_FILLDATA | 0 | ← 8010 |
| PACTYP_MPEGH3DACFG | 1 | |
| PACTYP_MPEGH3DAFRAME | 2 | |
| /* reserved for ISO use */ | 3-5 | |
| PACTYP_SYNC | 6 | |
| PACTYP_SYNCGAP | 7 | |
| PACTYP_MARKER | 8 | |
| PACTYP_CRC16 | 9 | |
| PACTYP_CRC32 | 10 | |
| PACTYP_DESCRIPTOR | 11 | |
| PACTYP_USERINTERACTION | 12 | |
| PACTYP_LOUDNESS_DRC | 13 | |
| PACTYP_BUFFERINFO | 14 | |
| PACTYP_SYSMETA —7020 | 15 | ← 8150 |
| /* reserved for ISO use */ | 16-127 | |
| /* reserved for use outside of ISO scope */ | 128-261 | |
| /* reserved for ISO use */ | 262-389 | |
| /* reserved for use outside of ISO scope */ | 390-517 | |
| NOTE: Application-specific MHASPacketType values are mandated to be in the space reserved for use outside of ISO scope. These are skipped by a decoder as a minimum of structure is required by the decoder to skip these extensions. | | |

FIG. 9

| Syntax | No. of bits |
|---|---|
| SysMetaPacket() 9000<br>{<br>  9010 — sysType;<br>  9020 — dataLen = escapedValue (4, 8, 16);<br>  9030 — sysData;<br>} | <br><br>8<br><br>8*dataLen |

FIG. 10

| sysType 1000 | Value | Corresponding MIME Type | |
|---|---|---|---|
| Undefined | 0 | | —1010 |
| SYS_MMT | 1 | application/mmt-signaling+xml | —1020 |
| SYS_DASH | 2 | application/dash+xml | —1030 |
| /* reserved */ | 3-127 | /* reserved for ISO use */ | —1040 |
| /* reserved */ | 128-255 | /* reserved for user private */ | —1050 |

FIG. 11

| Syntax | No. of bits | Mnemonic |
|---|---|---|
| SysMetaPacket() { | | |
| 1110 —— sysType; | 8 | Uimsbf |
| 1120 —— dataLen = escapedValue (5, 8, 0); | | |
| 1130 —— sysDataLocation; | 8*dataLen | Bslbf |
| 1140 —— isDataUpdated; } | 1 | Uimsbf |

FIG. 12

| Syntax | No. of bits | Mnemonic |
|---|---|---|
| SysMetaPacketConfig() { | | |
| 1210 —— programID; { | 32 | Uimsbf |

FIG. 13

```
If (programID)
{
    if    (programID ~= preProgramID)
    {
        sprintf(msg,"< mProgID=₩"%d₩">", programID);
        sendSysMessage(msg);
    }
    preProgramID = programID;
}
```

FIG. 14

```
If (programID)
{
    if    (sysType == SYS_MMT)       sprintf(msg, "<application/mmt-signaling+xml;url=\"%s\";mProgID=\"%d\">",
                                             sysDataLocation, programID );
    elseif (sysType == SYS_DASH)     sprintf(msg, "<application/dash+xml;url= \"%s\";mProgID=\"%d\">",
                                             sysDataLocation, programID );
}
```

FIG. 15

```
If (programID)
{
    if      ( prevSysDataLocation ~= sysDataLocation )    sendSysMessage(msg);
    elseif  ( isDataUpdated == TRUE )                     sendSysMessage(msg);
    prevSysDataLocation = sysDataLocation;
}
```

METHOD AND APPARATUS FOR DECODING AUDIO BITSTREAM INCLUDING SYSTEM DATA

CROSS-REFERENCE TO RELATED APPLICATIONS

This application is a continuation of U.S. patent application Ser. No. 16/246,042 filed Jan. 11, 2019, which is a continuation of U.S. patent application Ser. No. 15/550,842 filed Aug. 14, 2017 (now U.S. patent Ser. No. 10/217,471), which is a National Stage Entry of PCT/KR2016/001508 filed Feb. 15, 2016, which claims priority from U.S. Provisional Application No. 62/238,832 filed Oct. 8, 2015, U.S. Provisional Application No. 62/181,089, filed Jun. 17, 2015, U.S. Provisional Application No. 62/173,665 filed Jun. 10, 2015, U.S. Provisional Application No. 62/166,056 filed May 25, 2015, U.S. Provisional Application No. 62/117,746 filed Feb. 18, 2015, U.S. Provisional Application No. 62/116,533 filed Feb. 15, 2015, and U.S. Provisional Application No. 62/116,424 filed Feb. 14, 2015. The entire disclosures of the prior applications are considered part of the disclosure of the accompanying continuation application, and are hereby incorporated by reference.

TECHNICAL FIELD

The present invention relates to a method and apparatus for decoding an audio bitstream including system data, and more particularly, to a method and apparatus for transmitting and restoring system data by using an MPEG-H 3D audio stream packet.

BACKGROUND ART

According to changes in the broadcasting environment, a terrestrial broadcast is more likely to be provided to a user through retransmission using a set-top box instead of being provided to a user through terrestrial transmission.

When a terrestrial broadcast signal is retransmitted by using a set-top box or the like, a high-definition multimedia interface (HDMI), is mainly used as an interface between the set-top box and a television (TV). However, since the HDMI does not provide an interface for transmitting data other than audio data and video data, e.g., system data, system data may not be transmitted to the TV via the HDMI.

In this case, in order to use a bidirectional broadcasting service or a hybrid broadcasting service, a user must use a channel transmitted from a set-top box to a broadcasting company, and a TV is unable to function alone as a medium for bidirectional broadcasting.

DETAILED DESCRIPTION OF THE INVENTION

Technical Problem

Since a high-definition multimedia interface (HDMI) does not require a separate compression process for transmission of audio or video, no additional hardware or software is necessary for restoration, and digital content may be transmitted without any deterioration in quality. However, as described above, since the HDMI does not provide an interface for transmitting data other than audio data and video data, e.g., system data, system data may not be transmitted to a TV via the HDMI.

The present invention is suggested to solve the above-described problems of the related art and to transmit system data by using an audio bitstream transmitted through the HDMI.

Technical Solution

According to an aspect of the present invention, there is provided a method of decoding audio, the method including receiving a bitstream consisting of audio packets; decoding an audio packet included in the received bitstream, extracting a type of the decoded packet; obtaining system data from a packet of which system metadata corresponds to the extracted packet type; and transmitting the obtained system data to a system engine, wherein the system data includes at least one of information regarding the type of the system engine and a length of the system data.

According to another embodiment, an audio bitstream is received via a high definition multimedia interface (HDMI).

According to another embodiment, the receiving further includes determining whether to use the obtained system data.

According to another embodiment, the type of the system engine indicates at least one of MPEG media transport (MMT) and dynamic adaptive streaming over HTTP (DASH).

According to another embodiment, the system data is obtained based on location information regarding the system data.

According to another embodiment, the location information regarding the system data indicates a uniform resource locator (URL) where the system data is located.

According to another embodiment, the bitstream is an MPEG-H 3D audio stream (MHAS).

According to another aspect of the present invention, there is provided an audio decoding apparatus including a receiver configured to receive a bitstream consisting of audio packets; a decoder configured to decode an audio packet included in the received bitstream, a controller configured to extract a type of the decoded packet and obtains system data from a packet of which system metadata corresponds to the extracted packet type; and a transmitter configured to transmit the obtained system data to a system engine, wherein the system data includes at least one of information regarding the type of the system engine and a length of the system data.

According to another embodiment, the receiver is further configured to receive an audio bitstream via a high definition multimedia interface (HDMI).

According to another embodiment, the controller determines whether to use the obtained system data.

According to another embodiment, the type of the system engine indicates at least one of an MPEG media transport (MMT) and a dynamic adaptive streaming over HTTP (DASH).

According to another embodiment, the system data is obtained based on location information regarding the system data.

According to another embodiment, the location information regarding the system data indicates a uniform resource locator (URL) where the system data is located.

According to another embodiment, the bitstream is an MPEG-H 3D audio stream (MHAS).

According to another aspect of the present invention, there are provided another method, another system, a computer program for implementing the method, and a non-transitory computer readable recording medium having recorded thereon the computer program.

Advantageous Effects of the Invention

According to the present invention, a content creator may generate an audio bitstream including system data by encoding using an audio codec defined in the MPEG-H standard. A set-top box may transmit an audio stream including system data to a TV using a high definition multimedia interface (HDMI) without having to change the interface connected to the TV. The TV may obtain system data by decoding the received audio bitstream by using an audio codec defined in the MPEG-H standard.

DESCRIPTION OF THE DRAWINGS

FIG. 7 is a diagram for describing a syntax for processing a payload of an MHAS packet according to an embodiment of the present invention.

FIG. 8 is a diagram showing MHASPacketType values regarding MPEG-H 3D audio stream (MHAS) packet types, according to an embodiment of the present invention.

FIG. 9 is a diagram for describing syntax for processing a system data packet, according to an embodiment of the present invention.

FIG. 10 is a diagram for describing syntax for processing a system data packet, according to an embodiment of the present invention.

FIG. 11 is a diagram showing syntax for processing a system data packet, according to another embodiment of the present invention.

FIG. 12 is a diagram showing a method of processing a system data packet by using a program identifier.

FIG. 13 is a diagram showing an operation of SysMetaPacketConfig according to an embodiment of the present invention.

FIG. 14 is a diagram showing an operation of SysMetaPacket according to an embodiment of the present invention.

FIG. 15 is a diagram showing an operation of the SysMetaPacket according to another embodiment of the present invention.

BEST MODE

Figure 1:
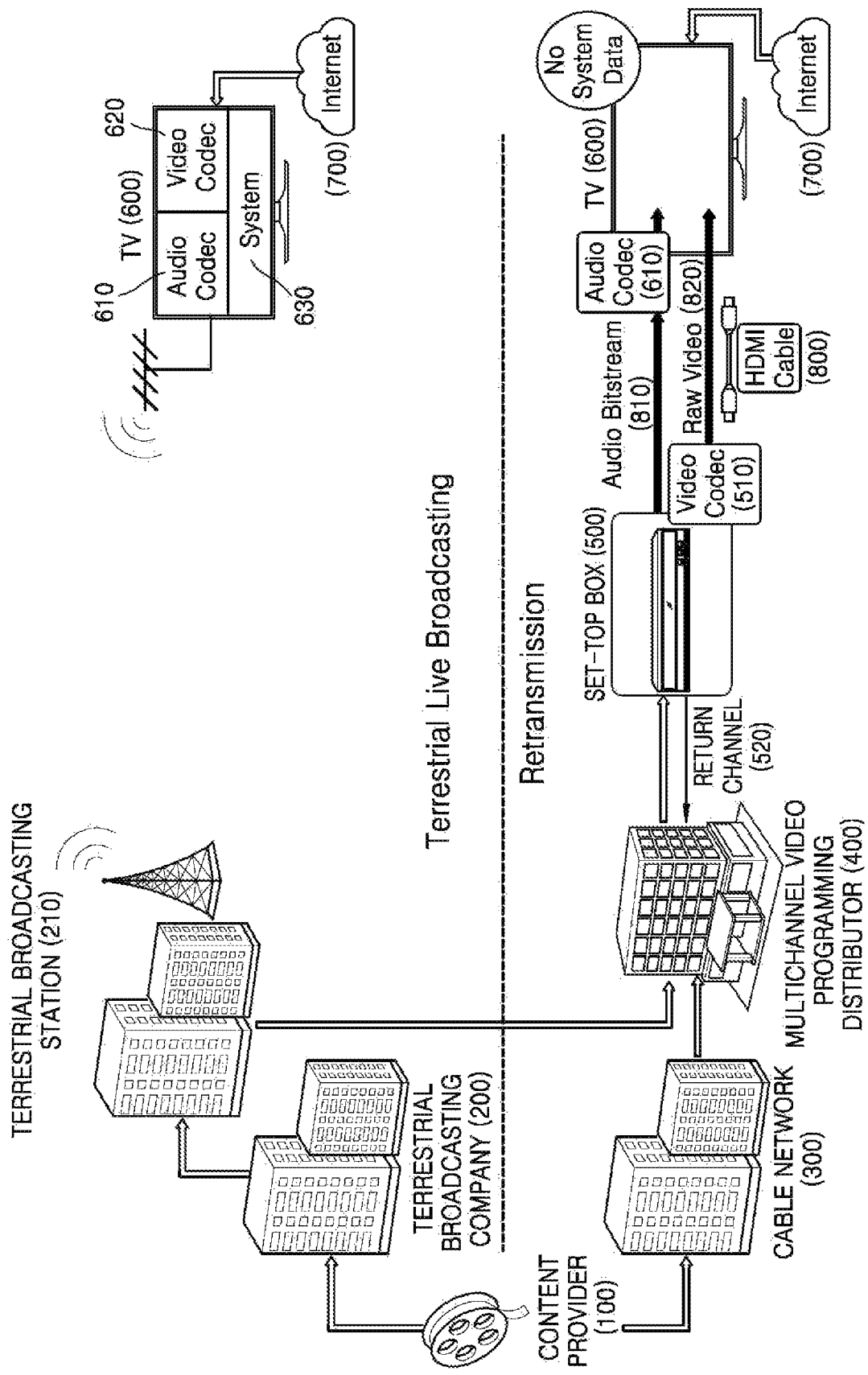
FIG. 1 is a diagram showing an embodiment of a transmission path of a terrestrial broadcast.

The representative technical configuration of the present invention for accomplishing the object is as follows.

Provided is a method of decoding audio, the method including receiving a bitstream consisting of audio packets; decoding an audio packet included in the received bitstream, extracting a type of the decoded packet; obtaining system data from a packet of which system metadata corresponds to the extracted packet type; and transmitting the obtained system data to a system engine, wherein the system data includes at least one of information regarding a type of the system engine and a length of the system data.

MODE OF THE INVENTION

The detailed description of the present invention given below refers to the accompanying drawings, which illustrate, by way of example, specific embodiments in which the present invention may be practiced. These embodiments are described in sufficient detail to enable one of ordinary skill in the art to practice the invention. It should be understood that the various embodiments of the present invention may different from one another, but need not be mutually exclusive.

For example, the specific shapes, structures, and characteristics described in this specification may be modified and changed from one embodiment to another without departing from the spirit and scope of the present invention. It should also be understood that the position or arrangement of individual components within each embodiment may be changed without departing from the spirit and scope of the present invention. Accordingly, the following detailed description is not to be taken in a limiting sense, and the scope of the present invention should be construed as encompassing the scope of the appended claims and all equivalents thereof.

Like reference numerals in the drawings denote like or similar components throughout the several aspects. In order to clearly illustrate the present invention, parts not related to the description of the present invention are omitted, and like parts are denoted by like reference numerals throughout the specification.

Hereinafter, various embodiments of the present invention will be described in detail with reference to the accompanying drawings so that those skilled in the art can easily carry out the present invention. The present invention may, however, be embodied in many different forms and should not be construed as limited to the embodiments set forth herein.

Throughout the specification, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

Hereinafter, definitions of terms used herein are as follows.

System data may be information related to a transport layer for multimedia transmission.

The system data is data related to a system engine, such as a MPEG media transport (MMT) engine or a dynamic adaptive streaming over HTTP (DASH) engine. The system data may comply with the multipurpose internet mail extensions (MIME) structure and may refer to a DASH media presentation description (MPD) or an MMT signaling message.

A MMT layer structure includes functional areas including an encapsulation layer, a delivery layer, and a signaling layer. A MMT layer operates on a transport layer.

The system data may include information regarding location of the system data. In this case, the location of the system data may indicate a uniform resource locator (URL) where the system data is located.

The system engine may refer to a DASH engine or an MMT engine.

The system data may include information regarding the type of a system engine. The information regarding the type of a system engine is a reference corresponding to the system data and may indicate a system engine, such as an MMT engine or a DASH engine.

The MMT is a transport layer standard for MEPG multimedia transmission and is intended for a push-based service as a standard to be used in broadcast and Internet multimedia applications.

The DASH is a standard for adaptive video streaming, which is separated from the MMT and is standardized before the MMT. Intended for a pull-based service, the DASH defines multimedia presentation description format, which includes type of fragments of multimedia data (that is, segment files) and information related thereto.

Hereinafter, the present invention will be described in detail with reference to the accompanying drawings.

FIG. 1 is a diagram showing an embodiment of a transmission path of a terrestrial broadcast.

A content provider (programmer) 100 may provide contents to users generally in two ways.

The first method of providing contents to a user is a method of providing contents through wireless transmission performed by a terrestrial broadcasting company 200. The terrestrial broadcasting company 200 transmits signals for terrestrial broadcasting through a transmission tower of a terrestrial broadcasting station 210. At this time, signals for terrestrial broadcasting transmitted through the communication tower are transmitted over land in the form of radio waves and include audio signals, video signals, and system data.

A content playback apparatus 600 is typically a television (TV), and the content playback apparatus 600 may receive signals for terrestrial broadcast by using an outdoor antenna or the like. Since the signals for terrestrial broadcast received by the content playback apparatus include audio signals, video signals, and system data, the content playback apparatus 600 may include an audio codec 610 for decoding audio content, a video codec for decoding video content, and a system engine 630 for processing system data.

Ultra high definition (UHD) content is encoded according to the moving picture experts group (MPEG) standard, which is the international standard, and transmitted, wherein system data thereof satisfies the MPEG-H transport layer standard, which is a highly-efficient video coding standard.

Data broadcast may be divided into unidirectional broadcast and bidirectional broadcast depending on whether there is a return channel or a return signal. In the early days of data broadcast, such as ATSC 1.0, techniques were developed mainly for unidirectional broadcast. However, in recent years, bi-directional broadcasts, in which additional data is added to existing broadcasting signals, are provided together, such that users may search for or receive information related to broadcast programs or other information while watching TV.

In a hybrid broadcast providing both unidirectional broadcast and bidirectional broadcast, a TV may function as a medium for interaction between content and a user, and the TV is designed to be connectable to an Internet network 700 for implementing the hybrid function.

A second method of providing contents to a user is a method of retransmitting terrestrial broadcasting contents through a wire transmission provided by a multichannel video programming distributor 400 or the like. The multichannel video programming distributor 400 is a service provider that delivers video programming services as specified by the Federal Communications Commission (FCC). According to the FCC regulations, "a person such as, but not limited to, a cable operator, A multichannel multipoint distribution service, a direct broadcast satellite service, or a television receive-only satellite program distributor, who makes available for purchase, by subscribers or customers, multiple channels of video programming".

The multichannel video programming distributor 400 includes a cable TV, a satellite TV, and an IPTV, refers to a company that organizes real-time channels and provides contents of broadcast channel using companies (program provider). Recent trends related to multichannel video programming distributors 400 include activation of horizontal combination, increased price for content transmission, and launching of real-time over the top (OTT) service. In North American region, the multichannel video programming distributor 400 is referred to as Broadcast Distribution Undertaking in Canada.

The multi-channel video programming distributor 400 provides broadcasting contents to a user by retransmitting broadcasting contents transmitted from the terrestrial broadcasting company 200 or a cable network 300. The broadcasting contents retransmitted from the multi-channel video programming distributor 400 are received by a set-top box 500 specialized for each multi-channel video programming distributor.

Broadcasting contents received by the set-top box 500 may include audio data, video data, and system data in the form of encoded bit streams. The set-top box 500 may include a video codec 510 for decoding video data. The set-top box 500 transmits a received audio bitstream 810 or an audio PCM and a raw video data 820 generated by decoding received video data to the content playback apparatus 600.

The content playback apparatus 600 may directly reproduce the decoded video data 820 or an audio PCM transmitted from the set-top box 500. Since the content playback apparatus 600 may include an audio codec 610 for decoding audio content, the content playback apparatus 600 may decode the audio bit stream 810 transmitted from the set-top box 500 and reproduce audio content.

Here, the interface between the set-top box 500 and the content playback apparatus 600 is mainly a high-definition multimedia interface, that is, a HDMI. HDMI is an uncompressed digital video/audio interface standard, and HDMI enables a user to enjoy higher quality sound and video than using a conventional analog interface.

HDMI is a modification of DVI, which is the standard of the interface between a PC and a display apparatus, for AV electronics, is a digital interface for transmitting video signals and audio signals without compression, and provides interfaces between a multimedia source supporting the HDMI, such as a set-top box and a DVD player, and an AV device including a PC and a TV and a monitor.

Since the HDMI does not involve a separate compression process for transmission of audio or video, no additional hardware or software for reconstruction is necessary. However, since the HDMI does not provide an interface for transmitting data other than audio data and video data, e.g., system data, system data may not be transmitted to the content playback apparatus 600 via the HDMI.

Therefore, when the set-top box 500 is connected to the content playback apparatus 600 via a HDMI cable 800, hybrid broadcast data or system data required for broadband connection is not transmitted to the content playback apparatus 600.

In this case, a user must use a return channel 520 transmitted from the set-top box 500 to the multi-channel video programming distributor 400 in order to use a bidirectional broadcasting service, and the content playback apparatus 600 is unable to function alone as a medium for interaction between content and a user.

Figure 2:
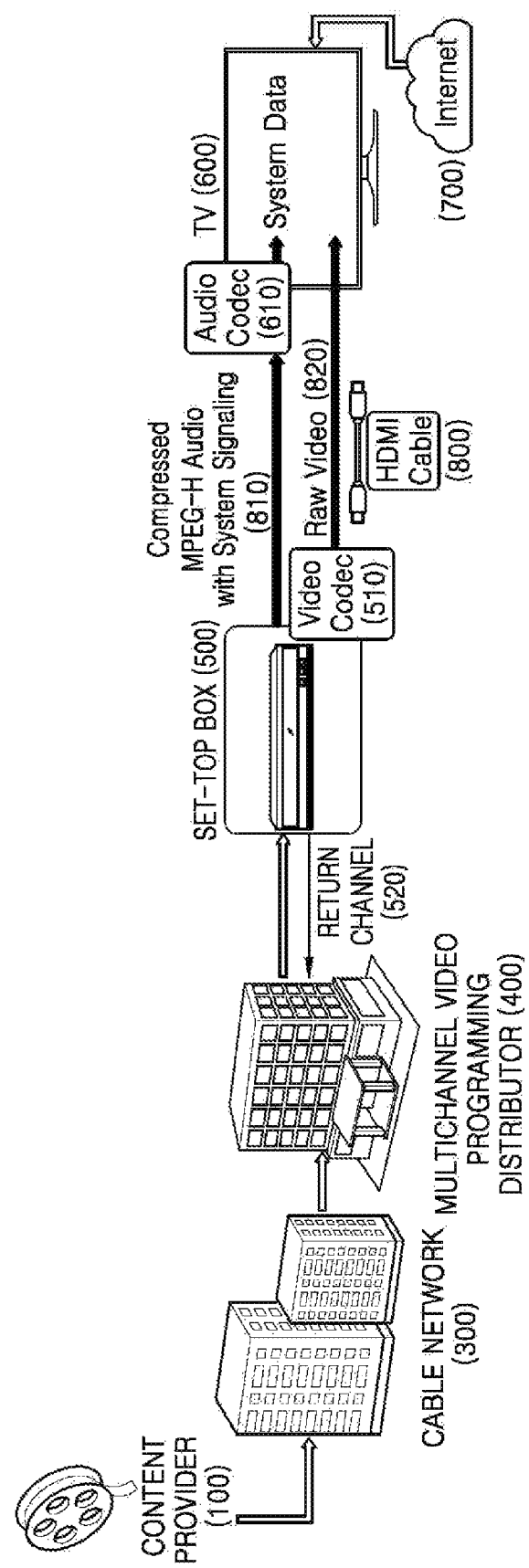
FIG. 2 is a diagram showing a transmission path of a terrestrial broadcast according to an embodiment of the present invention.

FIG. 2 is a diagram showing a transmission path of a terrestrial broadcast according to an embodiment of the present invention.

The embodiment shown in FIG. 2 relates to a method of retransmitting terrestrial broadcasting content through a wire transmission provided by the multichannel video programming distributor 400 and, as in the embodiment shown in FIG. 1, broadcasting contents retransmitted from the multichannel video programming distributor 400 is received by the set-top box 500 specialized for each multichannel video programming distributor.

However, in the embodiment shown in FIG. 1, since system data is not included in the data transmitted to the content playback apparatus 600 through the HDMI, a user who receives retransmitted content through the set-top box 500 is unable to use a bidirectional broadcasting service.

In the embodiment shown in FIG. 1, it is necessary to determine which transmission channel is available and which data is to be transmitted, in order to additionally transmit system data. When an audio bitstream is used as a carriage for transmitting system data, a user who receives retransmitted contents through the set-top box 500 may also use a bidirectional broadcasting service.

In other words, when system data is included in audio data and the audio data is encoded as in the embodiment shown in FIG. 2, the audio data of content retransmitted from the multi-channel video programming distributor 400 includes information regarding the system data. Therefore, even when terrestrial broadcasting content is retransmitted through the set-top box 500, the system data may be transmitted to the content playback apparatus 600 through the audio channel of the HDMI.

Specifically, the content provider 100 encodes audio data of broadcasting content, the content provider 100 includes system data in the audio data and encodes the audio data. The terrestrial broadcasting company 200 or the cable network 300 transmits broadcasting content received from the content provider 100 to the multichannel video programming distributor 400, and the multichannel video programming distributor 400 retransmits the broadcasting content received from the terrestrial broadcasting company 200 or the cable network 300 to the set-top box 500 of a user.

The broadcasting content received by the set-top box 500 may include audio data, video data, and system data in the form of encoded bit streams. In this case, the system data received by the set-top box 500 may be other system data not included in the audio data.

The set-top box 500 may include the video codec 510 for decoding video data. The set-top box 500 transmits a received audio bit stream 810 to the content playback apparatus 600 and transmits the raw video data 820 generated by decoding received video data to the content playback apparatus 600. At this time, the audio bitstream may be a compressed MPEG-H audio stream including system data for system signaling.

Since the content playback apparatus 600 may include an audio codec 610 for decoding audio content, the content playback apparatus 600 may decode the audio bit stream 810 transmitted from the set-top box 500 and reproduce audio content.

According to another embodiment of the present invention, the terrestrial broadcasting company 200, the cable network 300, or the multi-channel video programming distributor 400 corresponding to another content provider may encode audio data, such that system data is included in an audio bit stream.

Advantages of transferring system data by using an audio transmission channel from among various transmission channels are as follows.

An audio bitstream may be the best carrier for transferring data from a set-top box to a TV, that is, a content playback apparatus, through the HDMI. An MPEG-H 3D audio stream (MHAS) has a flexible scheme. Therefore, when an audio bitstream is used as a carriage for transmitting system data as in the embodiment shown in FIG. 2, an MHAS may be utilized.

In this case, system data is encapsulated in an MHAS packet and becomes a part of an MPEG-H 3D audio data stream.

The MPEG system standards provide well-defined functional terms and stability. Furthermore, in the actual usage, an MPEG system receiver is expected to be a TV in most cases. Since an MPEG audio is already implemented in a TV, the TV is capable of processing an audio bitstream complying with the MPEG standard. In other words, when an MPEG-H 3D audio is used as a data transmitter, the syntax of the MPEG system may be used as-is.

When an MPEG-H 3D audio is used as a data transmitter, a service scenario using system data may be implemented by transmitting system data as an MHAS packet through an HDMI connection as shown in FIG. 2.

Figure 3:
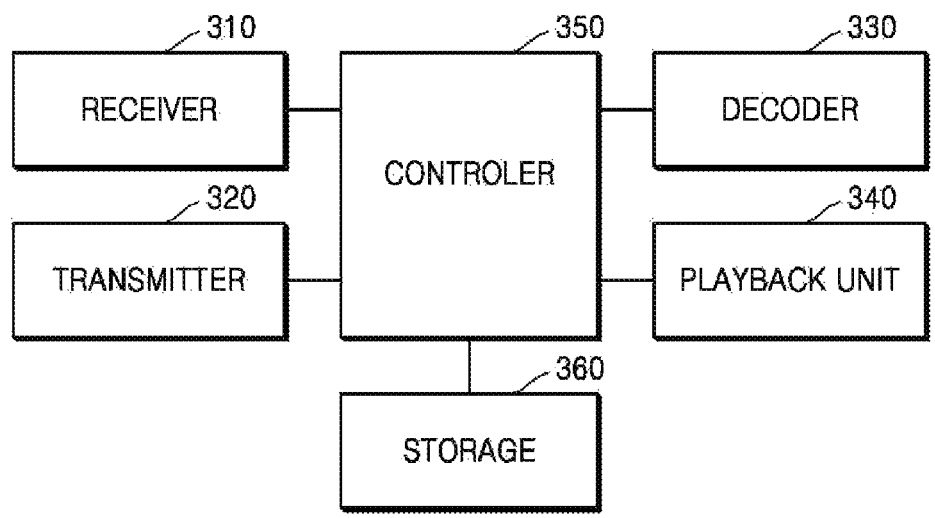
FIG. 3 is a diagram showing a detailed configuration of a content playback apparatus including an audio decoding apparatus according to an embodiment of the present invention.

FIG. 3 is a diagram showing the detailed configuration of the content playback apparatus 600 including an audio decoding apparatus according to an embodiment of the present invention.

As shown in FIG. 3, the content playback apparatus 600 including an audio decoding apparatus according to an embodiment of the present invention includes a receiver 310, a transmitter 320, a decoder 330, a playback unit 340, a storage unit 360, and a controller 350.

The receiver 310 receives content or the like transmitted from a set-top box. According to embodiments, content transmitted without a set-top box may also be received, but a description thereof will be omitted herein.

When a set-top box is connected to the content playback apparatus 600 through the HDMI, a signal received through the receiver 310 becomes decoded raw video data and an un-decoded audio stream. Since the HDMI does not have a separate channel for transmission of system data, system data may not be independently received through the HDMI. However, according to an embodiment of the present invention, since system data is included in an audio bitstream, the system data may be received through the HDMI.

The transmitter 320 transmits restored system data transmitted from the decoder 330 to a system engine.

The decoder 330 decodes received content according to a codec used when the received content is encoded. When the content playback apparatus 600 is a TV, the decoder 330 may perform both video decoding and audio decoding. When the content is received through the HDMI connected to the set-top box 500, since received video is already decoded, only a received audio bitstream is decoded.

According to an embodiment of the present invention, since the audio bitstream includes system data, restored system data may be obtained together with a restored audio signal as a result of decoding the audio bitstream. The decoder 330 may transmit the obtained system data to a system engine corresponding to the system data.

The playback unit 340 plays back the restored video or audio through a display, a speaker, or the like.

The controller 350 controls the operation of the entire content playback apparatus 600 and controls the operation of the receiver 310, the transmitter 320, the decoder 330, the playback unit 340, and the storage unit 360, such that the content playback apparatus 600 reproduces restored content and transmits obtained system data to a system engine.

The controller 350 may determine whether to use the system data included in the audio bitstream based on the audio bitstream received through the receiver 310. When the controller 350 determines to use the system data, the decoder 330 transmits the system data to the transmitter 320 to transmit the extracted system data to a system engine.

Figure 4:
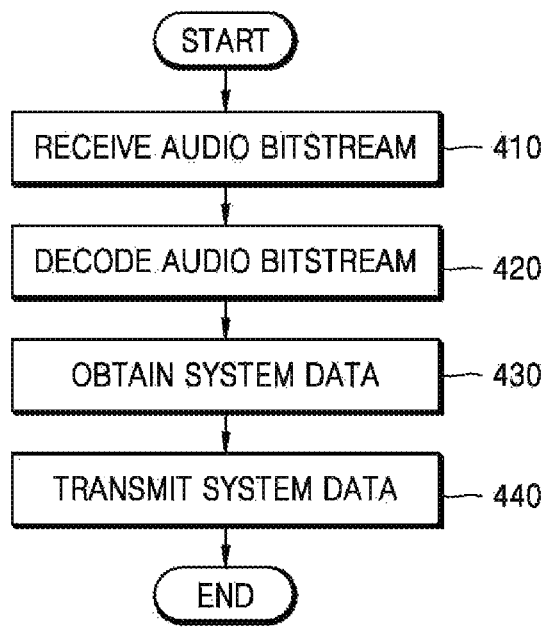
FIG. 4 is a flowchart of an audio decoding method according to an embodiment of the present invention.

The storage unit 360 stores various types of information necessary for the content playback apparatus 600 to restore and reproduce the content and various types of information necessary for processing system data. FIG. 4 is a flowchart of an audio decoding method according to an embodiment of the present invention.

The content playback apparatus 600 receives content through the receiver 310 (operation 410). When a set-top box is connected to the content playback apparatus 600 via the HDMI, a signal received through the receiver 310 becomes decoded raw video data and an un-decoded audio stream.

The decoder 330 of the content playback apparatus decodes a received audio bitstream according to a codec used for audio encoding (operation 420).

According to an embodiment of the present invention, since the audio bitstream includes system data, restored system data may be obtained together with a restored audio signal as a result of decoding the audio bitstream (operation 430).

The decoder 330 may also transmit the obtained system data to a system engine (operation 440).

Figure 5:
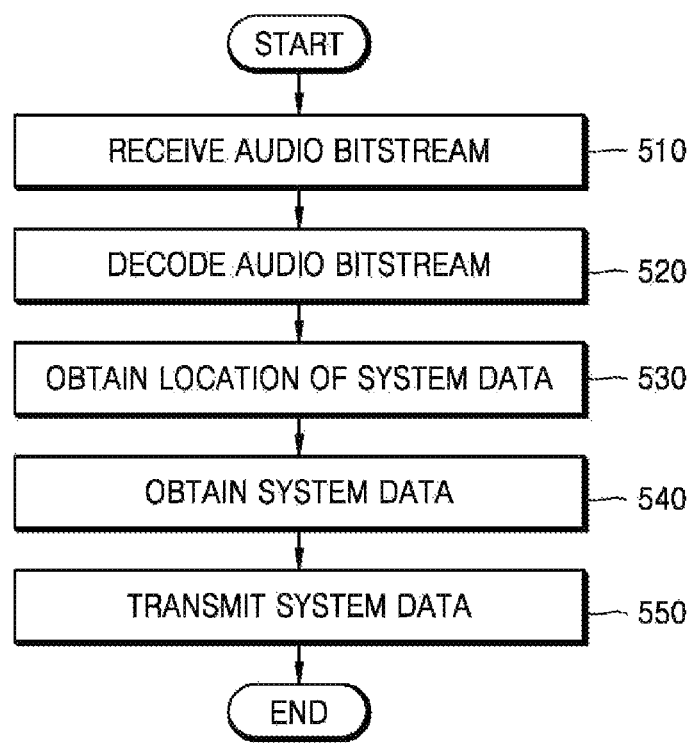
FIG. 5 is a flowchart of an audio decoding method according to another embodiment of the present invention.

FIG. 5 is a flowchart of an audio decoding method according to another embodiment of the present invention.

An audio bitstream is a good carrier for transmitting system data. However, when the length of system data becomes excessively large, the size of an audio bitstream also becomes large, and thus a sufficient capacity (bandwidth) necessary for the audio data may not be guaranteed. Therefore, it is necessary to limit the length of system data in order to secure a sufficient capacity for audio data.

In this case, system data may not be directly included in an audio bitstream. Therefore, according to another embodiment of the present invention, the system data may be stored in a specific location (server), and the audio bitstream may include the location of the system data. Here, the location of the system data may be a uniform resource locator (URL).

For example, the maximum length of system data that may be included in an audio bitstream is limited to 256 bytes and, when the length of the system data exceeds the maximum size, a URL indicating the location of the system data is included in the audio bitstream.

The embodiment shown in FIG. 5 is similar to the embodiment shown in FIG. 4 and additionally includes only the operation 530 for obtaining the location of system data in comparison with the embodiment shown in FIG. 4.

Figure 6:
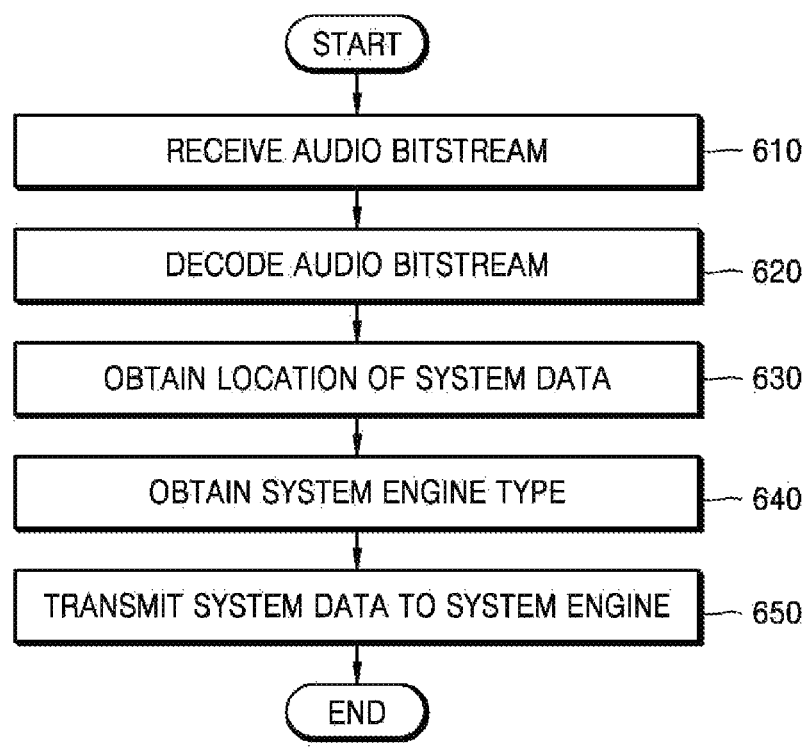
FIG. 6 is a flowchart of an audio decoding method according to another embodiment of the present invention.

FIG. 6 is a flowchart of an audio decoding method according to another embodiment of the present invention.

The content playback apparatus 600 receives content through the receiver 310 (operation 610). When a set-top box is connected to the content playback apparatus 600 via the HDMI, a signal received through the receiver 310 becomes decoded raw video data and an un-decoded audio stream.

The decoder 330 of the content playback apparatus 600 decodes a received audio bitstream according to a codec used for audio encoding (operation 620).

According to an embodiment of the present invention, since the audio bitstream includes system data, restored system data may be obtained together with a restored audio signal as a result of decoding the audio bitstream (operation 630).

Here, system data may have a structure or syntax according to a system engine to which the system data is to be applied. Therefore, it is necessary to perform an operation 640 for checking the type of the system engine first to process the system data. The system engine may refer to a dynamic adaptive streaming over HTTP (DASH) engine or an MPEG media transport (MMT) engine represented by a sysType, which is a parameter regarding a system type.

At this time, when a system engine defined in the system type does not exist, it is determined that system data is not to be used and the system data is ignored. When a system engine defined in the system type exists, it is determined that the system data is not to be used, and the system data is transmitted to a system engine corresponding to the system type (operation 650).

The embodiment shown in FIG. 6 is similar to the embodiment shown in FIG. 4 and further includes an operation for obtaining a system engine type is added in comparison with the embodiment shown in FIG. 4, wherein the operation 430 for transmitting system data is modified to an operation 650 for transmitting system data to a system engine corresponding to the obtained type.

Hereinafter, a method of transmitting MPEG system data by using an MHAS packet of MPEG-H 3D audio will be described with reference to FIGS. 7 through 16.

Referring to FIGS. 7 through 15, syntaxes representing system data according to various embodiments will be described.

When MPEG system data is transmitted by using a MHAS packet of MPEG-H 3D audio, each term may be defined as follows.

System data includes information indicating (1) which content is to be played back, (2) which part of a screen the content is played back in, or (3) when the playback of the content starts.

The system data is data related to a system engine, such as an MMT or a DASH and may refer to a DASH media presentation description (MPD) or an MMT signaling message that complies with a multipurpose internet mail extensions (MIME) structure indicating the location of the system data.

A system packet refers to a complete MHAS packet including a header, such as a type, a label, and a length, and the system packet may be transmitted to a system engine in an unaltered state. The system packet may include information, such as information regarding whether the system packet is extended or information regarding the version of system data.

Alternatively, system data extracted from a system packet may be transmitted to a system engine.

A system message is a message generated by an MPEG-H 3D audio decoder and transmitted to a system outside the audio decoder and may refer to a program identifier program ID, a system type sysType, a system data location sysDataLocation, and an update status IsUpdated. Each message will be described later.

A system data URL refers to a URL where system data is located. When the metaType of the system data URL is UTF-8 SYS_META_UTF8, sysDataLocation (described later) indicates the URL of the system data. When the metaType of the system data URL is a fixed 64-bit unsigned integer most significant bit first (uimsbf) binary SYS_META_FIXED_64, sysDataLocation64 indicates the URL of the system data.

The system engine may refer to a dynamic adaptive streaming over HTTP (DASH) engine or an MPEG media transport (MMT) engine indicated by the sysType, which is a parameter regarding the system type.

A system refers to a UHD TV or the like, which is hardware in which MPEG-H 3D audio is implemented, and an MPEG-H 3D decoder is implemented within the system.

The content playback apparatus 600 may obtain and read parameters for system data from a data stream according to an order and the number of bits of at least one syntax exemplified in FIGS. 7 through to 16.

FIG. 7 is a diagram for describing a syntax for processing a payload of an MHAS packet according to an embodiment of the present invention.

MHASPacketPayload 7000 is a syntax for processing a payload according to the MHAS packet type of an MPEG-H 3D audio. In MHASPacketPayload 7000, a component and a parser may be defined to use PACTYP_SYSMETA 7020 of MHASPacketType 7010. By modifying an MHASPacketPayload function defined in an MPEG-H codec as shown in FIG. 7, it may be implemented to use an MHAS packet to transmit MPEG system data.

In other words, when the MHAS packet type MHASPacketType 7010, which indicates the MHAS packet type of an MPEG-H 3D audio, corresponds to the system metadata PACTYP_SYSMETA 7020, SysMetaPacket 7030 is invoked.

FIG. 8 is a diagram showing MHASPacketType values regarding MHAS packet types according to an embodiment of the present invention.

When the MHAS packet type MHASPacketType 7010 of an MPEG-H 3D audio is PACTYP_FILLDATA, MHASPacketType has a value of 0 (8010) and fills data according to the length of an MHAS packet.

When the MHAS packet type of the MPEG-H 3D audio is the PACTYP_SYSMETA 7020, the MHASPacketType 7010 has a value of 15 (8150), and the system metadata is obtained by invoking the SysMetaPacket and transmitted to a system (7030).

When the MHASPacketType 7010 has a value of 16 or greater, it means that the MHAS packet type is not defined and is reserved.

FIG. 9 is a diagram for describing a syntax for processing a system data packet according to an embodiment of the present invention.

When an MHAS packet type corresponds to PACTYP_SYSMETA, system data is configured by using 'SysMetaPacket' (9000) as shown in FIG. 9.

The 'SysMetaPacket' 9000 is defined to read system data sysData 9030 having a byte size corresponding to a dataLen 9020 and transmit it to a system corresponding to the sysType 9010.

The sysType 9010 is an 8-bit uimsbf and indicates the MIME type for which system data is used or the type of a system engine to which the system data sysData 9030 is to be transmitted.

The dataLen 9020 indicates the length of system data, and the maximum length of system data may be limited to 256 bytes. Since the length of system data is limited, when the length of the system data exceeds 256 bytes, instead of system data, a URL indicating the location of a DASH MPD or an MMT package access (PA) signaling message may be included in an audio bit stream and transmitted.

FIG. 10 is a diagram for describing a syntax for processing a system data packet according to an embodiment of the present invention.

FIG. 10 shows a syntax of the sysType 9010, and the first column of FIG. 10 shows types of system engines that the sysType 9010 may have. The second column of FIG. 10 shows values of the sysType 9010 according to types of system engines, and the third column shows MIME types corresponding to types of system engines.

When the sysType 9010 is not defined, the sysType value is 0, and a corresponding MIME type is also not defined.

When the sysType 9010 is MMT, the sysType value is 1, and a corresponding MIME type is application/MMT signaling and extensible markup language (xml).

When the sysType 9010 is DASH, the sysType value is 2, and a corresponding MIME type is application/DASH signaling and extensible markup language (xml).

When the sysType value is 3-255, the definition of the type is reserved. Specifically, definition of the type is reserved for the international organization for standardization (ISO) when the value is 3-127, and definition of the type is reserved for user setting when the value is 128-255.

The sysType corresponding to a type of the system engine may comply with the MIME type, but may also not comply with the MIME type. In such a case, MIME type information is ignored.

If the sysType 9010 is not defined or reserved, system data is discarded.

FIG. 11 is a diagram showing a syntax for processing a system data packet according to another embodiment of the present invention.

As described above, since the data capacity for an audio bitstream is limited, when the capacity of system data is large, it is impossible to include the entire system data in the audio bitstream. Therefore, the maximum length of the system data is limited to 258 bytes. When the length of system data exceeds 258 bytes, the location of the system data may be included in an audio bitstream instead of the system data.

'SysMetaPacket' 1100 reads three fields including sysType 1110, sysDataLocation 1130, and isDataUpdated 1140.

The sysType 1110 is an 8-bit uimsbf, which indicates the MIME type for which system data is used and the type of a system engine to which the system data sysData 1130 is to be transmitted.

The dataLen 1120 indicates the length of system data, and the maximum length of system data may be limited to 258 bytes. Since the length of system data is limited, when the length of system data exceeds 258 bytes, a URL indicating the location of a DASH MPD or an MMT PA signaling message may be included in an audio bitstream instead of the system data and transmitted.

The sysDataLocation 1130 is a 8*dataLen bit bit string left bit first (bslbf) and may indicate a URL where system data is located.

IsDataUpdated 1140 is a Boolean flag indicating whether system data at the sysDataLocation 1130 has been changed and is designated to prevent unnecessary patching and to perform efficient patching.

FIG. 12 is a diagram showing a method of processing a system data packet by using a program identifier.

'SysMetaPacketConfig' 1200 of FIG. 12 indicates a syntax for processing a system data configuration according to an embodiment. When an MHAS packet type corresponds to PACTYP_SYSMETA, the 'SysMetaPacketConfig' 1200 may be additionally defined as shown in FIG. 7.

The 'SysMetaPacketConfig' 1200 reads a program identifier programID 1210 to prevent erroneous execution of a system. The program identifier 1210 is a 32-bit uimsbf.

The program identifier 1210 indicates a unique identifier of a current program or indicates whether a current program uses a system data carriage. In other words, the program identifier 1210 is used to check whether read-out system data is valid for a program currently being executed.

The initial value of the program identifier programID is set to 0, and the program ID is updated when a program is changed due to a channel change or the like. Before SysMetaPacket is invoked, the programID may be checked by invoking SysMetaPacketConfig first, thereby determining whether a system data carriage is used and whether system data is valid for a program being executed.

For example, when a broadcast channel is changed and another program identifier is read, a system deletes all previous system messages for the other program identifier. When a current program does not use a system data carriage, the program identifier is set to 0(0x0000) and the system may delete all previous system messages.

Operations of SysMetaPacketConfig and SysMetaPacket will be described in more detail with reference to FIGS. 13 through 15.

FIG. 13 is a diagram showing an operation of SysMetaPacketConfig according to an embodiment of the present invention.

When a program ID is read from the SysMetaPacketConfig, a system message corresponding to the programID is transmitted to a system when the field value of the program ID is changed. Based on the programID in the system message, the system may be informed an event to reset previous system data, such as a channel change of a source device. At this time, in the SysMetaPacketConfig, a system message determined as shown in FIG. 13 is transmitted to the system.

FIG. 14 is a diagram showing an operation of the SysMetaPacket according to an embodiment of the present invention.

When the SysMetaPacket is executed, an MPEG-H 3D audio decoder combines the MIME type, a data URL, and a current program identifier as shown in FIG. 14 and generates a system message msg.

FIG. 15 is a diagram showing an operation of the SysMetaPacket according to another embodiment of the present invention.

In order to prevent unnecessary patching, an MPEG-H 3D audio decoder may be configured to transmit system message msg to a system only when the sysDataLocation is changed or when system data at a link corresponding to the sysDataLocation is changed as shown in FIG. 15 without changing the sysDataLocation.

The MPEG-H 3D audio decoder generates and transmits a system message, such that the system may patch system data located at the sysDataLocation and transmit the system data to a system engine. The system data located at the sysDataLocation is a DASH PMD or MMT signaling message and may comply with the MIME type.

In the above description, the operation of an MPEG-H 3D audio decoder to provide an interface by which a system patches system data located at the sysDataLocation and transmit the system data to a system engine has been described.

Figure 16:
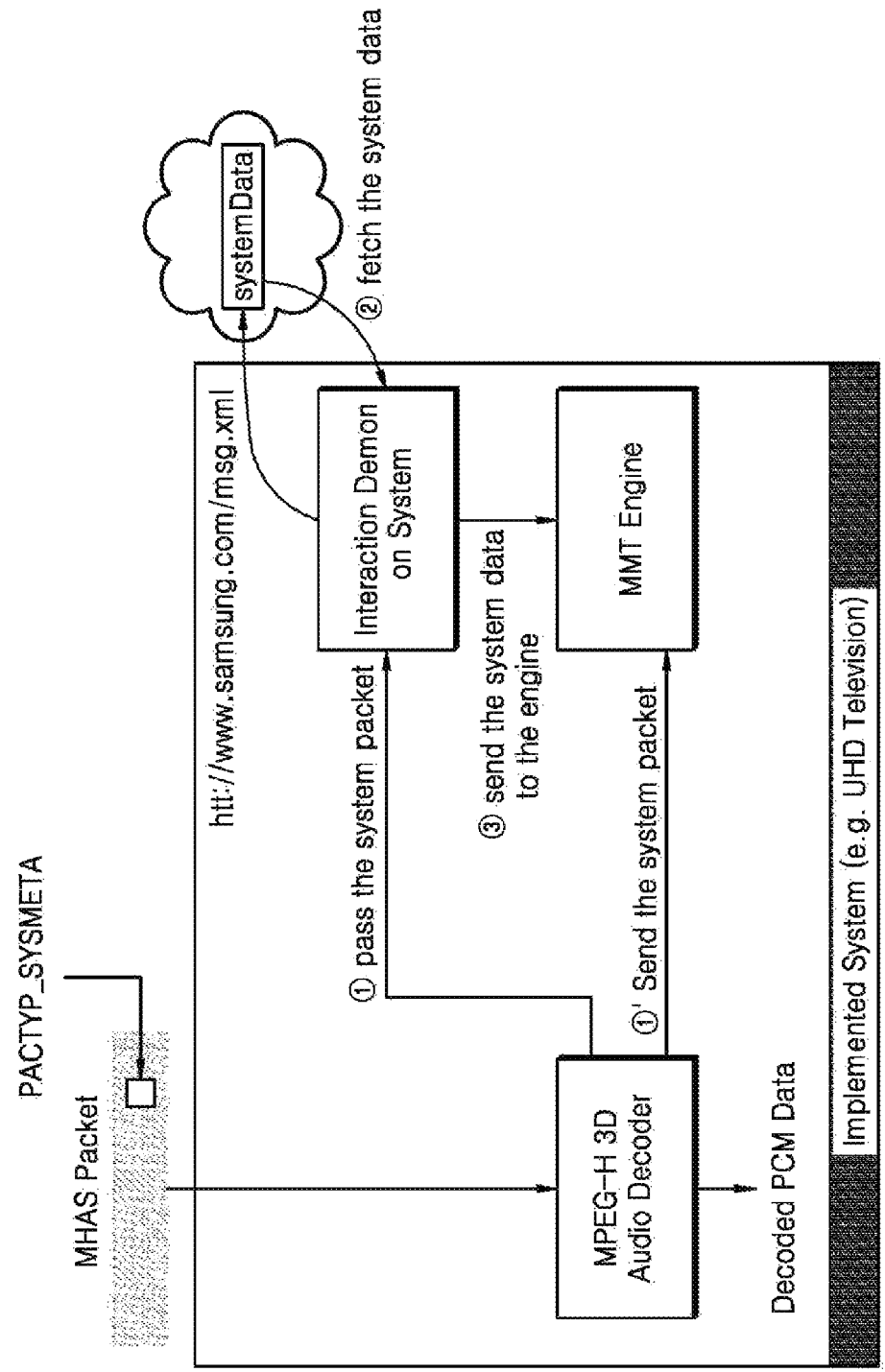
FIG. 16 is a diagram showing an outline of a system level operation according to an embodiment of the present invention.

FIG. 16 is a diagram showing an outline of a system level operation according to an embodiment of the present invention.

In order to use an MPEG-H 3D audio signal as a system data carrier, an MPEG-H 3D audio decoder and a system engine must interact with each other. The following operations must be implemented, such that a system patches system data and transmits the system data to the system engine.

(1) When a system message msg generated by SysMetaPacket is received, the system determines whether the system message msg may be processed based on whether a target system engine exists within the system and whether the system is connected to a broadband network.

(2) When it is determined that the system message msg may be processed, system data defined in a URL field in the system message msg is patched. When the URL is identical to a previously received URL and isUPdated is 0, the system may not patch the system data.

(3) The patched system data is transmitted to a system engine corresponding to an MIME type description.

Furthermore, when a program is changed, an event should be detected to clear previously loaded system messages and data.

(1) When a system message msg having only an mProgID field generated by SysMetaPacketConfig is received from an audio decoder, the system compares the mProgID with previously received mProgID. When they are different from each other, all operations and buffers related to programID other than the mProgID are deleted and all system data belonging to other programs are deleted.

(2) When the mProgID is changed, the system transmits a system message indicating that, since the program is changed, previously loaded system operations regarding the previous program will not be executed.

A content playback apparatus including an audio decoding apparatus according to an embodiment of the present invention may be a TV, and a system engine according to another embodiment of the present invention may be an MMT engine.

When an MHAS packet of which the MHASPacketType is PACTYP_SYSMETA is transmitted to the MPEG-H 3D audio decoder, the decoder transmits decoded PCM data to a playback unit (not shown) and transmits a system packet to the MMT engine (1').

When the capacity of system data is large and the system packet includes the location of the system data instead of the system data, the decoder transmits the system packet to a daemon for processing a system message (1). The daemon patches the system data based on the location included in the system message (2) and transmits system data obtained by patching the system data to the MMT engine (3).

The MMT engine patches an MMT PA message by using the received system packet or the received system data and interprets the MMT PA message.

The above-described embodiments of the present invention may be implemented as programmable instructions executable by a variety of computer components and stored in a non-transitory computer readable recording medium. The non-transitory computer readable recording medium may include program instructions, a data file, a data structure, or any combination thereof. The program instructions stored in the non-transitory computer readable recording medium may be designed and configured specifically for the present invention or can be publicly known and available to those of ordinary skill in the field of software. Examples of the non-transitory computer readable recording medium include a hardware device specially configured to store and perform program instructions, for example, a magnetic medium, such as a hard disk, a floppy disk, and a magnetic tape, an optical recording medium, such as a CD-ROM, a DVD, and the like, a magneto-optical medium, such as a floptical disc, a ROM, a RAM, a flash memory, and the like. Examples of the program instructions include machine codes made by, for example, a compiler, as well as high-level language codes executable by a computer using an interpreter. The above exemplary hardware device can be configured to operate as one or more software modules in order to perform the operation in an exemplary embodiment, and vice versa.

While the present invention has been particularly shown and described with reference to exemplary embodiments thereof, it is to be understood that the invention is not limited to the disclosed embodiments, but, on the contrary, those skilled in the art will appreciate that various modifications, additions and substitutions may be made without departing from the scope and spirit of the invention as disclosed in the accompanying claims.

Accordingly, the spirit of the present invention should not be construed as being limited to the above-described embodiments, and all ranges equivalent to or equivalently modified from the claims of the present invention belongs to the technical spirit of the present invention.

The invention claimed is:

1. An audio decoding apparatus comprising:
a receiver configured to receive an audio bitstream comprising packets;
a processor configured to:
identify a type of a packet among the packets; and
obtain system data and a type of a system engine which corresponds to the system data from the packet, if the identified type of the packet indicates system meta data; and
a transmitter configured to transmit the packet including the type of the system engine and the system data to the system engine, if the type of the system engine is defined,
wherein the processor is further configured to discard the packet including the type of the system engine and the system data if the type of the system engine is not defined.

2. The audio decoding apparatus of claim 1, wherein the type of the system engine indicates at least one of MPEG media transport (MMT) and dynamic adaptive streaming over HTTP (DASH).

3. The audio decoding apparatus of claim 1, wherein the audio bitstream is received via a high definition multimedia interface (HDMI).

4. The audio decoding apparatus of claim 1, wherein the system data is obtained based on location information regarding the system data.

5. The audio decoding apparatus of claim 4, wherein the location information regarding the system data indicates a uniform resource locator (URL) where the system data is located.

6. The audio decoding apparatus of claim 1, wherein the audio bitstream is an MPEG-H 3D audio stream (MHAS).

7. The audio decoding apparatus of claim 1, wherein the type of the packet is included in a header of the packet, and the system data and the type of the system engine is included in a payload of the packet.

8. An audio decoding apparatus comprising:
a receiver configured to receive an audio bitstream comprising packets;
a processor configured to:
obtain a type of a packet among the packets from a header of the packet; and
obtain system data and a type of the system data from a payload of the packet according to the type of the packet; and
a transmitter configured to transmit the packet to a system engine which corresponds to the type of the system data, if the type of the system data is defined,
wherein the processor is further configured to discard the packet if the type of the system data is not defined.

9. The audio decoding apparatus of claim 8, wherein the processor is configured to obtain the system data if the type of the packet indicates system meta data.

10. The audio decoding apparatus of claim 8, wherein the type of the system engine indicates at least one of MPEG media transport (MMT) and dynamic adaptive streaming over HTTP (DASH).

11. The audio decoding apparatus of claim 8, wherein the audio bitstream is received via a high definition multimedia interface (HDMI).

12. The audio decoding apparatus of claim 8, wherein the system data is obtained based on location information regarding the system data.

13. The audio decoding apparatus of claim 12, wherein the location information regarding the system data indicates a uniform resource locator (URL) where the system data is located.

14. The audio decoding apparatus of claim 8, wherein the audio bitstream is an MPEG-H 3D audio stream (MHAS).

* * * * *